US006804525B2

(12) United States Patent
Davis et al.

(10) Patent No.: US 6,804,525 B2
(45) Date of Patent: Oct. 12, 2004

(54) METHOD AND APPARATUS FOR FACILITATING TWO-WAY COMMUNICATIONS BETWEEN VEHICLES

(75) Inventors: Walter L. Davis, Arlington, WA (US); Randolph M. Doi, Burr Ridge, IL (US); Don Remboski, Dearborn, MI (US); William F. Zancho, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/114,503

(22) Filed: Apr. 2, 2002

(65) Prior Publication Data

US 2003/0186675 A1 Oct. 2, 2003

(51) Int. Cl.[7] .......................... H04Q 7/20; H04L 12/28; H04L 12/56
(52) U.S. Cl. ..................................... 455/456.1; 370/390
(58) Field of Search .............................. 455/403, 456.1, 455/454, 414; 370/390

(56) References Cited

U.S. PATENT DOCUMENTS

| 6,034,625 | A | 3/2000 | Mitsuno |
| 6,484,027 | B1 | 11/2002 | Mauney et al. |
| 2001/0026552 | A1 * | 10/2001 | Spratt et al. ................. 370/390 |
| 2002/0037715 | A1 | 3/2002 | Mauney et al. |
| 2002/0045455 | A1 * | 4/2002 | Spratt .......................... 455/456 |

OTHER PUBLICATIONS

International Search Report for PCT/03/08233 of Jun. 25, 2003.

* cited by examiner

*Primary Examiner*—William Cumming
(74) *Attorney, Agent, or Firm*—James A. Lamb

(57) ABSTRACT

An in-vehicle system (10) having a radio (12) sends and receives messages that include an identifier that uniquely identifies the vehicle and that further includes affinities as correspond to the vehicle and/or occupants of the vehicle. The messages can constitute requests for information (43), offers to provide information (44), and other representations. Such requests and offers can correlate to an information payload contained within the message and/or to the affinities set forth in the message identifier.

25 Claims, 3 Drawing Sheets

METHOD AND APPARATUS FOR FACILITATING TWO-WAY COMMUNICATIONS BETWEEN VEHICLES

TECHNICAL FIELD

This invention relates generally to wireless two-way communications and more particularly to communications between vehicles and between occupants of vehicles.

BACKGROUND

Wireless communications are known. Wireless systems making use of frequency reuse, such as cellular systems, are virtually ubiquitous and dispatch services are also well integrated and dispersed. Both are key components of modern infrastructure.

Now, at least one group seeks to define a new wireless communications service to specifically facilitate terrestrial-based vehicular journeys (particularly for automobiles and trucks). Presently known as dedicated short range communications (DSRC), the Federal Communications Commission in the United States has presently at least tentatively identified spectrum that can be used for such journey-related information. The American Society for Testing and Materials presently acts as a standards development group to define such a communications service to support provision of journey-related information to vehicular users. At present, the over-the-air interface has not been defined (though at least two wireless local area network systems—the I.E.E.E.#802.11A and Motorola's control channel based Freespace system—have been proposed and are being considered). This group has, however, made considerable progress towards defining the services that the service will support. In particular, such a journey-related information provision system should ultimately provide roadside information and corresponding vehicle-to-vehicle communications to support both public safety and private requirements (depending upon the application transmission range will likely vary from fifteen meters to three hundred meters).

As an example of public safety services, such a roadside information system can be expected to support:

Traffic count (for example, determining the number of vehicles that traverse an intersection over a given period of time);

Traffic movement information;

Toll collection;

In-vehicle signage (for example, presenting "stop" information within the cockpit of a vehicle as the vehicle approaches a stop sign);

Road condition warnings;

intersection collision avoidance (including highway/rail intersections);

Vehicle-to-vehicle information (for example, stopped vehicle or slowing vehicle information);

Rollover warnings;

Low bridge warnings;

Border clearance facilitation;

On-board safety data transfer;

Driver's daily log;

Vehicle safety inspection information; and

Emergency vehicle traffic signal preemption.

Examples of private requirements include;

Premises access control;

Gasoline payment;

Drive-through retail payment;

Parking lot payments;

Various vehicular related data transfers (for example, diagnostic data, repair service record data, vehicular computer program updates, map information, and user content such as music);

Rental car processing;

Fleet management;

Locomotive fuel monitoring; and

Locomotive data transfer.

These capabilities and services hold promise for safer, more convenient, and more pleasurable terrestrial based journeys. Notwithstanding such promise, however, certain needs and opportunities remain unmet and unaddressed by either such systems as proposed above or as are otherwise available in the prior art. For example, vehicle to vehicle communications are only modestly considered. In general, despite the presence of a high number of vehicles on most roads at any given place or time, most vehicles (and the occupants of such vehicles) remain an island unto themselves. Little opportunity exists for entertaining and/or helpful communications between vehicles.

In years past, citizens band radio offered some capacity in this regard. For a variety of reasons, however, including a general inability to obtain relevant information without resorting to time-consuming gregarious communications, such radios see only limited use in present time.

A need therefore exists for a way to better facilitate vehicle to vehicle communications. Preferably, communications should generally remain relevant and pertinent to either the vehicle and/or occupants thereof. Conversely, distracting irrelevant information should preferably be minimized. Also preferably, such communications should favorably leverage the information opportunities represented by the vast numbers of vehicles and vehicle occupants that are on the roads at any given time. Also, with digital short range communications likely to be adopted for use in a considerable number of vehicles, a solution that is at least compatible with such communications and which preferably leverages the presence of such communications capability would aid in ensuring a cost-efficient and more widely available solution.

BRIEF DESCRIPTION OF THE DRAWINGS

These and other needs are substantially met through provision of the method and apparatus for facilitating two-way communications between vehicles as described below. These and other benefits will become more clear upon making a thorough review and study of the following detailed description, particularly when considered in conjunction with the drawings, wherein.

DETAILED DESCRIPTION

Generally speaking, the embodiments taught herein facilitate the short range transmission (or reception and subsequent processing) of messages that include both an information payload and an identifier. The identifier includes at least portions of a unique identifier for a vehicle and an affinity selection. The affinity selection in particular facilitates the establishment of vehicle to vehicle communications that are of increased potential value to both vehicles and/or occupants of the vehicles. In particular, vehicles and/or vehicle occupants can readily and efficiently locate and communicate with other vehicles and/or occupants that constitute what may be viewed as a virtual fleet. At the same time, these affinity selections can be utilized to automatically screen (and even ignore) communications having a reduced likelihood of relevance or interest. Perhaps more importantly, these affinity selections can be utilized to prevent likely irrelevant communications from being transmitted in the first place.

Figure 1:
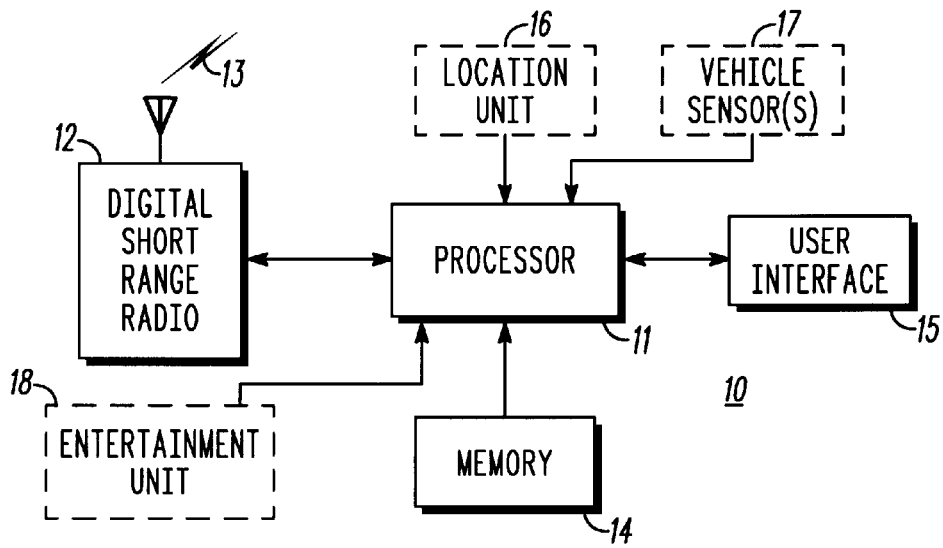
FIG. 1 comprises a block diagram depiction of a system configured in accordance with an embodiment of the invention.

Referring now it to the illustrations, and in particular to FIG. 1, a system 10 configured in accordance with various embodiments of the invention will now be described in more detail. The system 10 is arranged and configured to be mounted within a vehicle such as an automobile, truck, recreational vehicle, or other powered terrestrial vehicle. The system 10 includes a processor 11 that comprises a computational platform with sufficient computational capability and features to support the various capabilities and activities as described below. Many such computational platforms exist and selecting a particular platform involves a variety of considerations regarding the particular setting and application that are not pertinent here. Therefore, for the sake of brevity and clarity additional description of the processor 11 will not be provided here.

A two-way radio 12 operably couples to the processor 11 such that the processor 11 can control the transmission payloads and activity of the radio 12 and can receive the message content of messages as received by the radio 12. In this particular embodiment, the radio 12 comprises a digital short range radio (for example, as contemplated by the Digital Short Range Communications standard) although other types of radios could be utilized as well where appropriate to a particular implementation. Such a digital short range radio 12 is capable of compatibly transmitting and receiving messages 13 to and from a corresponding roadside information service. So configured, therefore, roadside information (regarding, for example, local speed limits, driving conditions, road construction, and so forth) as transmitted by roadside beacons pursuant to the roadside information service are compatibly received by the digital short range radio 12 and thereafter processed and utilized or responded to as appropriate by the processor 11. (In this embodiment, the processor 11 and the digital short range radio 12 are presented as separate components. Many two-way radios 12 include an internal processor that can readily serve as the processor 11 of this system 10. Therefore, if desired, and as appropriate to a particular application, the processor 11 and the digital short range radio 12 can be comprised of an internal unit.)

The processor 11 also couples to a memory 14 and a user interface 15. The memory 14 can include programming to facilitate the functionality described below. The memory 14 can also store various identifier information including affinity information as described below in more detail. The user interface 15 can include both input and output capability as appropriate to the application. For example, the user interface 15 can include output devices such as a visual display and/or an audio transducer to render message content as received through the digital short range radio 12 discernible to an occupant of the vehicle in which the system 10 is mounted. The user interface 15 can include input devices such as a keyboard, an audio transducer to facilitate voice input, cursor movement mechanisms, and so forth, again as appropriate to a particular application.

Depending upon the embodiment and application, the processor 11 can also operably couple to a location unit 16, one or more vehicle sensors 17, and/or an entertainment unit 18. The location unit 16 can comprise, for example, a global positioning system device that receives global positioning system satellite telemetry and that uses such received information to calculate with considerable accuracy the present location of the receiver. Other location determining units exist as well and may be appropriate for use in a particular application. The vehicle sensors 17 as coupled to the processor 11 can include speedometer sensors, odometer sensors, and/or dead reckoning sensors that can provide information regarding the vehicle including, for example, a present heading. The entertainment unit 18 can comprise, for example, a radio receiver that receives entertainment broadcasts on AM, FM, or satellite channels. The entertainment unit 18 may also be capable of processing other media, including compact discs, prerecorded tape, and digital storage media. So configured, the processor 11 can optionally obtain information regarding a present location of the vehicle from the location unit 16, information regarding various vehicular metrics including present speed and heading from the vehicular sensors 17, and information regarding a presently selected entertainment selection in the vehicle from the entertainment unit 18.

The various components of the system 10 described above are each well understood in the prior art. Therefore, further elaboration will not be presented here for the sake of brevity and clarity.

Figure 2:
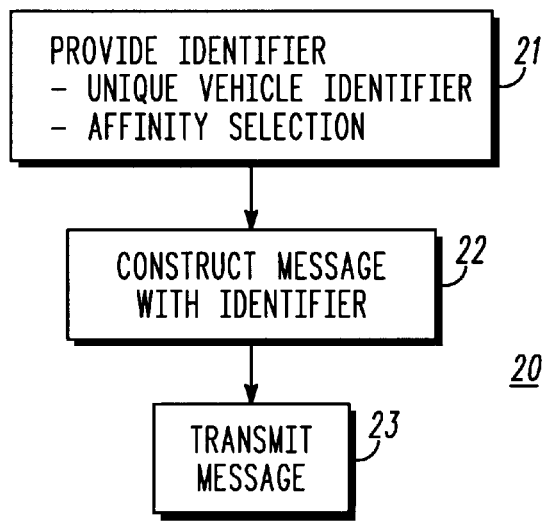
FIG. 2 comprises a flow diagram configured in accordance with an embodiment of the invention.

Referring now to FIG. 2, a fundamental capability 20 in accordance with various embodiments of the invention is that the system 10 can provide 21 an identifier, construct 22 a message using that identifier, and then transmit 23 that message to one or more other vehicles. When providing 21 the identifier, both a unique vehicle identifier and an affinity selection can be utilized. These are described below in more detail. Based upon this capability, many benefits are realized including the ability to attract and locate information and communications of relevance and interest to the vehicle and/or occupants of the vehicle.

Figure 3:
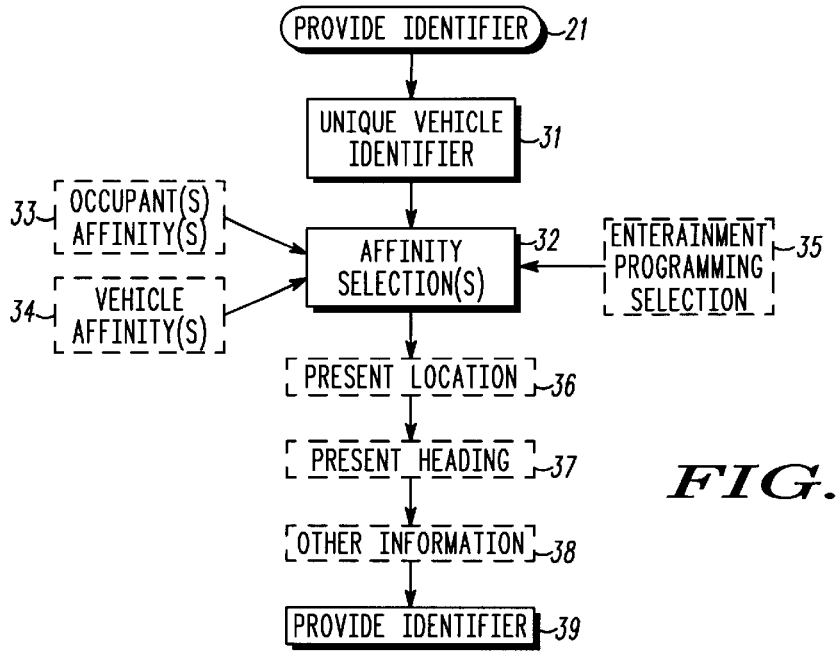
FIG. 3 comprises a detailed flow diagram configured in accordance with multiple embodiments of the invention.

As just described, the system 10 provides 21 an identifier. Referring now to FIG. 3, additional detail and various embodiments to provide 21 this identifier will be described.

The system 10 provides 31 a unique vehicle identifier. Such a unique vehicle identifier can be, for example, the vehicle identification number for the vehicle, a unique identifier as administered by some other processor or service, a vehicular license in combination with a state of issue identifier, a combination of these approaches, or any other identifier that will serve to uniquely identify the vehicle. This vehicular identifier allows subsequent messages to be uniquely received and processed by the system 10 in the vehicle and further serves to mark and identify transmitted messages as may be appropriate to facilitate at least certain of the capabilities described below.

To provide 21 a complete identifier the system 10 also selects 32 one or more affinities. For example, one or more affinities may be selected 32 from a group 33 of affinities as pertain to one or more occupants of the vehicle and/or from a group 34 of affinities as pertain to the vehicle itself. Such affinities can be many and varied. As regards occupants, such affinities can include, for example, personal interest categories of an occupant (such as specific hobbies, favorite musical genres or performers, and favorite sports teams), an activity that involves an occupant (such as present or impending attendance at a major event such as a large company picnic or an event at a sports stadium), and so forth. As regards vehicles, such affinities can include, for example, an attribute of the vehicle such as the manufacturer of the vehicle (such as Ford, General Motors, and Toyota) or the usage classification of the vehicle (such as convertible, sport utility vehicle, and so forth), an intended destination of the vehicle, a present route for the vehicle, and so forth.

When selecting 32 affinities, only the affinities for a selected occupant of the vehicle (such as, for example, the driver or front seat passenger) may be considered or, if desired, affinities for additional occupants can be considered (including all occupants where appropriate). Furthermore, for each occupant for whom an affinity is selected, a single affinity can be selected or multiple affinities can be selected (if desired, some occupants can be limited with respect to the number of affinities that may be selected while other occupants are not so limited). Also, when selecting 32 affinities, affinities from differing classes can be selected (for example, affinities from the class of occupant affinities and affinities from the class of vehicle affinities can both be selected).

In a system 10 embodiment wherein an entertainment unit 18 is operably coupled to the processor 11 such that the processor 11 can be cognizant of entertainment selections as made by one or more occupants within the vehicle, that entertainment programming selection 35 can be utilized to permit automatic selection of a corresponding affinity. For example, if the entertainment unit 18 is presently tuned to an entertainment broadcast channel that features classical music, this information can be provided to the processor 11 to allow the processor to select 32, for example, a classical music affinity for inclusion with the identifier. (At least some radio broadcasts include co-transmission of data that provides information regarding the broadcast, including station call signs and/or playlist genre information. Such information can be potentially used alone or in conjunction with other information (such as a lookup table that correlates station call signs with format genre) to thereby provide the characterizing information used by way of example above.)

Once the affinities have been selected 32, other information can optionally be included, in whole or in part, including present location information 36 as provided by the location unit 16, present heading information 37 as provided by the vehicle sensors 17, and other information 38 including both dynamically generated and previously configured informational payloads as appropriate to a given application. For example, if a specific road then being traveled had been selected 32 as a vehicle affinity, the present heading 37 might usefully be combined in the identifier with this specific road information to facilitate identifying the vehicle as being one that is traveling in a particular direction on a particular road.

Following the above steps, the identifier is then provided 39 as a combination, in whole or in part, of the various selected constituent identifier elements. As a result, the identifier both specifically identifies the vehicle and additionally provides affinity information that provides notice to other vehicles that receive the identifier regarding the interests and/or circumstances of the vehicle and/or the occupants. Receiving parties can utilize this identifier to both formulate an intent to communicate regarding one or more of the specified affinities and to act upon that intent by directing a targeted response to the specific vehicle.

Figure 4:
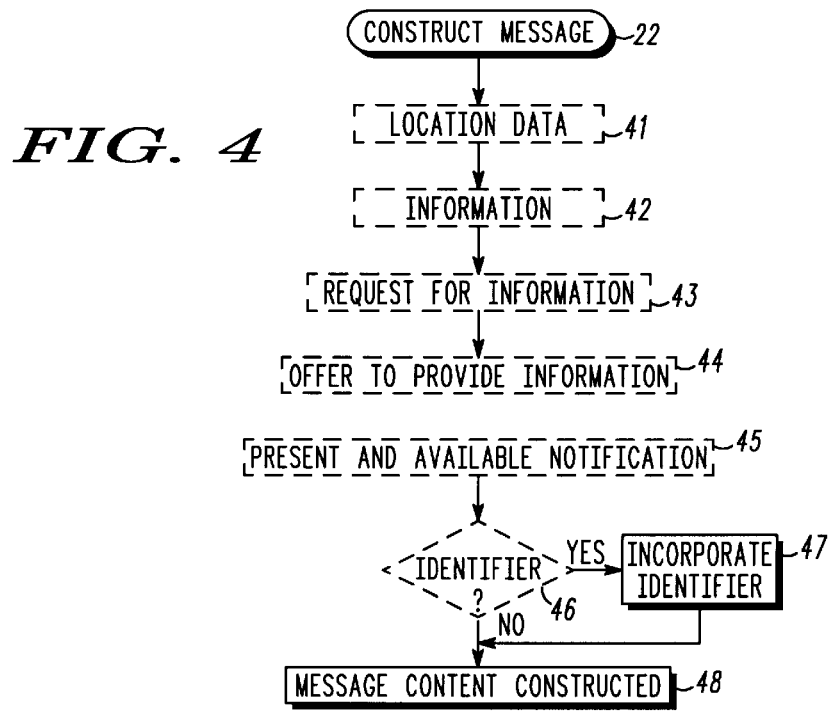
FIG. 4 comprises a detailed flow diagram configured in accordance with multiple embodiments of the invention.

As mentioned above with respect to FIG. 2, once the identifier has been provided 21, a message is constructed 22. Referring now to FIG. 4, additional details regarding construction of the message will be provided. Various kinds of data and information can be selected and incorporated into a message. For example, location data 41 can be incorporated into a message (as noted above, present vehicle location information can also be provided as part of the identifier; in addition, or in lieu thereof, location information can also comprise a valid part of various messages). Other information 42 can be incorporated into the message as well, including previously configured and stored information as well as newly created information. Such information 42 can include various content including, for example, journey related or diagnostic vehicular data, occupant profile and/or contact information, occupant text messages, and so forth. If desired, the location data 41 and the other information 42 can correlate to one another where appropriate.

In addition to optionally carrying a specific data payload, the message can include a specific request for information 43, and offered to provide information 44, or can serve as a notification that the vehicle/occupants are present and available for communications. When formulating a message that is requesting information 43, the information 42 in a corresponding payload can include details regarding the information that is sought. Conversely, or in addition, the request for information 43 can be issued in context with the affinity information included in the identifier that constitutes a part of the message in most instances. For example, if the affinity information indicates that the vehicle constitutes a part of a virtual fleet that is traveling north on a specific highway, then the request for information 43 indicator can constitute a request for information that is relevant to a vehicle traveling north on that highway.

When formulating a message that offers to provide information 44, all or part of that information can be provided as information 42 in the message payload or, in the alternative, no such information need be provided at all. Particularly in the event of the latter, a request for information must be issued by another vehicle before the offered information will be provided. The type of information that is being offered can be identified in the information 42 payload of the message and/or can be inferred from the selected and accompanying affinities. For example, if the affinity information indicates that an occupant is interested in personal computers, an offer to provide information 44 as accompanies such an indicator is reasonably interpreted as an offer to provide information regarding personal computers.

When formulating a message that constitutes a present and available notification 45, additional information 42 can be provided but ordinarily will not likely be necessary. Such a notification 45 indicates neither an offer to provide information nor a request for information, but does serve to indicate an interest in communicating regarding an affinity as set forth in the message identifier. Other vehicles/occupants as share that affinity can then choose to communicate if they so desire.

Generally speaking, such messages will be transmitted in conjunction with the identifier provided 21 above. For some purposes, however, it may not be necessary or appropriate to include that identifier. Some messages, for example, such as a warning regarding an accident at a particular location, may not benefit from inclusion of an identifier. To attend to this potential need, the system can optionally determine 46 whether an identifier should in fact be included with the message being constructed. If no identifier is needed, then the message content may be considered constructed 48 as it is. Again, however, in ordinary course, such a determination 46 will usually conclude that an identifier should be included following which the identifier can be incorporated 47 into the message content.

Once the message content has been constructed 48, additional steps and processing may be appropriate or necessary as depends upon a particular application. For example, error protection coding and/or encryption will result in further alterations to the form of the message although not usually to its content. Such techniques are well understood in the art and hence require no further elaboration here.

So configured, the system 10 can utilize wireless communications, including wireless communications that are compatible with digital short range radio frequency-based roadside information services, to facilitate communications between vehicles. Various messages can be transmitted, which messages include identifiers that specify affinities that correspond to the sourcing vehicle. These affinities can be readily utilized to filter reception processing and greatly facilitate identification of like minded parties and/or parties in like circumstances and subsequent communications of relevance and interest.

Figure 5:
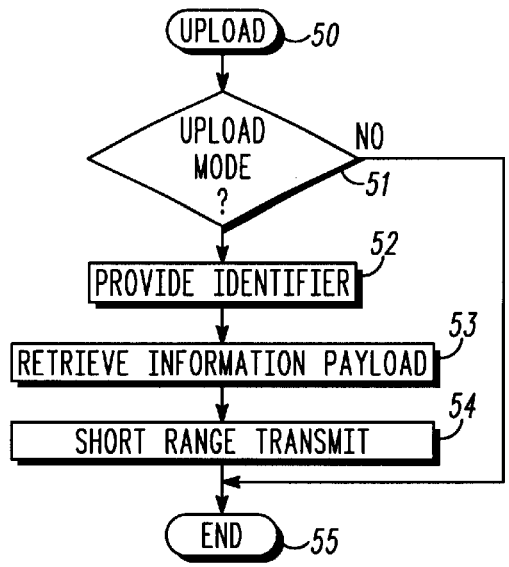
FIG. 5 comprises a flow diagram configured in accordance with the embodiment of the invention.

Various embellishments and modifications to the essential embodiments described above are of course possible. For example, and with reference to FIG. 5, in one upload mode 50 of operation assertion of the upload mode can be detected 51 (upload mode assertion can be sourced by, for example, an occupant using the user interface 15 or can be sensed as a command contained within a received message). Upon being detected 51, an identifier can be provided 52 as described above and combined with a retrieved information payload 53. This information payload 53 can be comprised partially or wholly of previously configured informational content. The message so constructed can then be transmitted 54 using the digital short range radio 12 and the process can conclude 55. So configured, prestored information (including lengthy missives) can be stored and later quickly retrieved when making, for example, a response to a request for information from another vehicle.

Figure 6:
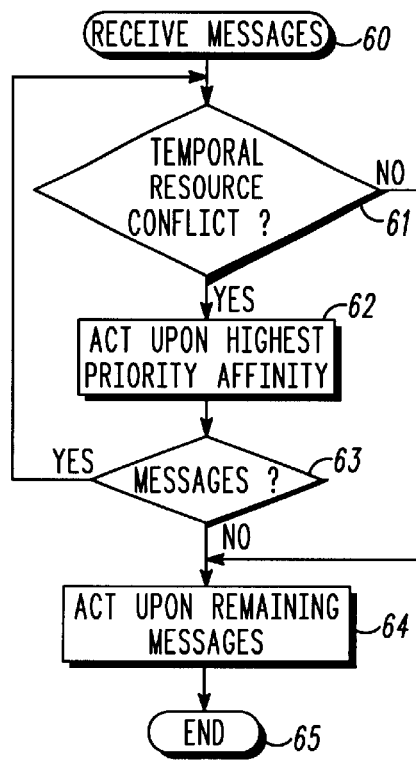
FIG. 6 comprises a flow diagram configured in accordance with an embodiment of the invention.

As indicated earlier, multiple affinities for multiple occupants can be included in the identifier. This raises the possibility, of course, that multiple responses will be garnered within the same relative window of time from different parties. This can raise problems if the processor 11 does not have the processing capacity to properly process all of these responses and/or if the user interface 15 is inadequate to render all of the responses simultaneously to the occupants. To at least ameliorate to some extent the problems associated with such occurrences, and referring now to FIG. 6, upon receiving messages 60 the processor 11 can determine 61 if a temporal resource conflict exists. If no such conflict exists, then the messages can be acted upon 64 without further intervention. If, however, a temporal resource conflict exists in that some aspect of the system 10 is incapable of supporting simultaneous action with respect to the received messages, then the processor 11 will act 62 upon the affinity (that is, the message that is associated with a particular affinity) having the highest priority. To do this, at least one of the affinities should have a previously assigned priority corresponding thereto. In addition, or in the alternative, incoming messages can have a priority indicator associated therewith. So configured, higher priority messages (including, in this example, messages that correspond to higher priority affinities) will be acted upon 62 before lower priority messages. For example, higher priority messages will be rendered audible or visually discernible before less important messages.

The processor 11 then determines 63 whether multiple messages yet remain. If so, then the process repeats. Otherwise, the last remaining message is acted upon 64 and the process concludes 65.

The embodiments described permit focused and efficient use of communications bandwidth and occupant's time and attention. Relevant communications are readily facilitated and irrelevant communications are largely avoidable. Both benefits are realized without requiring undue time and attention from an occupant. Further, these embodiments are readily consistent with and complementary to digital short range communications as may be otherwise utilized in a vehicle to support roadside information services that utilize such communications. This, of course, leads both to efficiencies and economies of scale.

Those skilled in the art will realize that the various embodiments described are subject to yet further modification, embellishments, and combination. It is therefore understood that the spirit and scope of the invention should not be viewed as being limited to the specific embodiments set forth,

We claim:

1. A method to facilitate two-way communications between at least two vehicles, comprising:

providing an identifier that includes at least a digitally stored unique identifier for a first one of the vehicles and a digitally stored affinity selection;

transmitting a digital short range message that includes at least a portion of the digitally stored unique identifier and the digitally stored affinity selection.

2. The method of claim 1 wherein the identifier further includes present location information for the first vehicle.

3. The method of claim 1 wherein the identifier further includes present heading information for the first vehicle.

4. The method of claim 1 wherein the identifier further includes a plurality of digitally stored affinity selections.

5. The method of claim 1 wherein the digitally stored affinity selection corresponds to at least one attribute of the first vehicle.

6. The method of claim 5 wherein the at least one attribute of the first vehicle pertains to a manufacturer of the first vehicle.

7. The method of claim 1 wherein the digitally stored affinity selection corresponds to at least one occupant of the first vehicle.

8. The method of claim 7 wherein the digitally stored affinity selection corresponds to a personal interest of at least one occupant of the first vehicle.

9. The method of claim 1 wherein the digitally stored affinity selection corresponds to an intended destination of the vehicle.

10. The method of claim 1 wherein the digitally stored affinity selection corresponds to an activity that involves at least one occupant of the vehicle.

11. The method of claim 1 wherein the digitally stored affinity selection corresponds to a fleet affiliation of the vehicle.

12. The method of claim 1 wherein the affinity selection includes a plurality of digitally stored affinity selections, wherein at least one digitally stored affinity selection corresponds to one occupant of the vehicle and another digitally stored affinity selection corresponds to a different occupant of the vehicle.

13. The method of claim 1 wherein providing an identifier that includes at least a unique identifier for a first one of the vehicles and digitally stored affinity selection includes automatically identifying the digitally stored affinity selection as based, at least in part, upon an entertainment selection in the first vehicle.

14. The method of claim 13 wherein automatically identifying the digitally stored affinity selection as based, at least in part, upon an entertainment selection in the first vehicle includes identifying an entertainment broadcast channel as is presently selected in the first vehicle.

15. The method of claim 1 wherein the short range message includes a request for information.

16. The method of claim 1 wherein the short range message includes an offer to provide information.

17. The method of claim 1 wherein the short range message comprises a present and available notification.

18. A method to facilitate communications between at least two vehicles, comprising:

providing an identifier that includes at least a digitally stored unique identifier for a first one of the vehicles and digitally stored affinity selection;

transmitting one of:

a first digital short range message that includes at least a portion of the digitally stored unique identifier and the digitally stored affinity selection;

a second digital short range message that does not include at least a portion of the identifier.

19. The method of claim 18 wherein the first short range message comprises one of a request for information and a present and available notification.

20. The method of claim 18 wherein the second short range message comprises a general broadcast containing information.

21. The method of claim 20 wherein the second short range message includes location data.

22. The method of claim 21 wherein the location data corresponds to the information.

23. A method to facilitate communications between at least two vehicles, comprising:

at a first vehicle;

detecting an occupant's assertion of a first mode of operation;

providing an identifier that includes at least a digitally stored unique identifier for the first vehicle;

transmitting a digital short range message that includes at least a portion of the digitally stored unique identifier and that includes a previously configured informational payload.

24. The method of claim 23 wherein the short range message further includes location data.

25. A method to facilitate two-way communications between at least two vehicles, comprising:

providing an identifier that includes at least a digitally stored unique identifier for a first one of the vehicles and a plurality of digitally stored affinity selections, wherein at least one of the digitally stored affinity selections is part of a first class of affinity selections and at least one of the digitally stored affinity selections is part of a second class of affinity selections; and when transmitting at least a first category of digital short range message, always including at least the digitally stored unique identifier and the digitally stored affinity selections that are part of the first class of affinity selections and optionally including as determined by an occupant of the first vehicle at least one of the digitally stored affinity selections that is part of the second class of affinity selections.

* * * * *